United States Patent Office 3,144,425
Patented Aug. 11, 1964

3,144,425
METHOD OF COATING FILM WITH A VINYLIDENE CHLORIDE COPOLYMER BLEND
Walter T. Koch, Drexel Hill, and Genevieve R. Stimmel, Swarthmore, Pa., assignors, by mesne assignments, to FMC Corporation, San Jose, Calif., a corporation of Delaware
No Drawing. Filed Nov. 5, 1959, Ser. No. 850,990
11 Claims. (Cl. 260—29.6)

This invention relates to a method of coating regenerated cellulosic film to obtain moistureproof, heat-sealable and non-blocking surfaces. More particularly, it concerns a method of coating regenerated cellulose using a blend of dispersed vinylidene chloride copolymers in aqueous dispersion media.

It is well known that vinylidene chloride polymers containing at least 80 percent of vinylidene chloride provide good moistureproof coatings for sheet material such as regenerated cellulose film. It is also known that long chain ($C_8$–$C_{18}$) alkyl acrylates and methacrylates when used as components of vinylidene chloride copolymers in amounts up to about 20 percent provide anti-blocking properties to the copolymer coatings while providing no improvement in the naturally poor heat-sealing ability thereof. Short chain ($C_1$–$C_6$) alkyl acrylates and methacrylates, acrylic and methacrylic acids, and acrylonitrile as monomer components of vinylidene chloride copolymers are known to provide strong heat seals and good anchorability, i.e. good coating adherence to the base film under high moisture conditions. Various methods have been proposed to take advantage of the good properties of these monomers while eliminating the undesirable ones. For example, it has been proposed to coat regenerated cellulose with certain interpolymer materials which consist of vinylidene chloride, a monomer component providing anti-blocking properties and a monomer component providing good heat seals. These interpolymers are reportedly superior to two-component copolymers. However, they are generally characterized by poor "slip" and blocking or matting tendencies. It has also been proposed to spray a vinylidene chloride copolymer coated film with 10 to 50 micron size particles of a copolymer similar to the coating material to prevent blocking. Materials coated in this manner have reduced clarity and are more easily scratched. Another proposal to utilize the desirable properties of various monomer components of vinylidene chloride copolymer coatings is to initially coat with a vinylidene chloride copolymer having one set of properties and then overcoat with a vinylidene chloride copolymer having other desirable properties which are lacking in the undercoating. Generally, this coating technique has not been too successful and has the disadvantage of producing an additional interface which provides still another surface from which a coating can separate under severe moisture conditions if incompatible with its adjacent layer.

It is an object of this invention to provide a method for coating regenerated cellulosic film wherein a moistureproof and heat sealable coating is established.

It is another object of this invention to provide a method for coating regenerated cellulose wherein good anti-blocking properties of the film are established.

It is still another object of this invention to provide a method for coating regenerated cellulose wherein one coating material provides moistureproofing, heat-seal and anti-blocking properties.

It is a further object of this invention to provide a stable, water based coating composition to be used in coating regenerated cellulosic film to impart improved properties thereto.

To accomplish the foregoing objects in accordance with the present invention, the improved method for coating regenerated cellulosic film comprises blending from 10 to 90 percent of an aqueous dispersion of a copolymer containing from about 85 to 94 percent by weight vinylidene chloride and from about 6 to 15 percent by weight of a monomer selected from the group consisting of ($C_8$–$C_{18}$) alkyl acrylates and methacrylates, and from 10 to 90 percent of an aqueous dispersion of a copolymer containing from about 80 to 94 percent by weight of vinylidene chloride and from about 6 to 20 percent by weight of a monomer selected from the group consisting of acrylonitrile, ($C_1$–$C_6$) alkyl acrylates and methacrylates, acrylic acid, and methacrylic acid; and coating the surface of regenerated cellulosic film with the blended aqueous dispersion.

Examples of $C_8$–$C_{18}$ alkyl acrylates and methacrylates useful for this invention include 2-ethylhexyl acrylate and methacrylate, octyl acrylate and methacrylate, nonyl acrylate and methacrylate, decyl acrylate and methacrylate, dodecyl acrylate and methacrylate, hexadecyl acrylate and methacrylate, and octadecyl acrylate and methcrylate. Mixtures of these higher alkyl acrylates and methacrylates may also be used in forming the copolymer.

Examples of $C_1$–$C_6$ acrylates and methacrylates include methyl acrylate and methacrylate, ethyl acrylate and methacrylate, propyl acrylate and methacrylate, isopropyl acrylate and methacrylate, butyl acrylate and methacrylate, isobutyl acrylate and methacrylate, amyl acrylate and methacrylate, isoamyl acrylate and methacrylate, hexyl acrylate and methacrylate, and isohexyl acrylate and methacrylate. Mixtures of these lower alkyl acrylates and methacrylates are also useful in forming the copolymers described herein.

In a preferred embodiment of this invention a method of coating regenerated cellulosic film comprises blending from 30 to 70 percent by weight of an aqueous dispersion of a copolymer containing from about 90 percent vinylidene chloride and about 10 percent of a monomer selected from the group consisting of ($C_8$–$C_{18}$) alkyl acrylates and methacrylates, and from about 30 to 70 percent by weight of an aqueous dispersion of a copolymer containing about 90 percent by weight of vinylidene chloride and about 10 percent by weight of a monomer selected from the group consisting of acrylonitrile, ($C_1$–$C_6$) alkyl acrylates and methacrylates, and coating regenerated cellulosic film with the blended aqueous dispersions.

The dispersion of the copolymer in aqueous solution is usually prepared by conducting polymerization in aqueous systems containing an initiator and activator, for example, ammonium persulfate and metasodium bisulfite, and any of the well known dispersing agents such as sodium lauryl sulfate and sodium tetradecyl sulfate. The dispersing agents are well known anionic and nonionic materials or combinations of both which aid in the formation and stabilization of the aqueous dispersion.

The aqueous dispersion of copolymer material referred to herein is usually termed a latex by those practicing this art because of its physical similarity to natural latex. Hereinafter the term "latex" will be used interchangeably with the term "aqueous dispersion of copolymers."

The following are examples demonstrating the method of this invention.

EXAMPLE I

A regenerated cellulose film, having a thickness of 0.9 mil and impregnated with an anchoring agent consisting of 0.15 percent by weight of the film of a melamine-formaldehyde precondensate, was coated with an aqueous dispersion which consisted of a blend of two copolymer latexes. The blend comprised latex A which contained a copolymer consisting of 90 parts vinylidene chloride and 10 parts of "decyl octyl" methacrylate ("decyl octyl" methacrylate was actually a blend of 40 percent decyl and 60 percent octyl methacrylate) and latex B which contained a copolymer consisting of 90 parts vinylidene chloride and 10 parts methyl methacrylate. Both latex A and B contained essentially the same concentration of salts and dispersant, and comprised 35 percent solids. The properties of the regenerated cellulose film coated with these latexes and with the latex blend are set forth in the following table:

*Table I*

| | Block | W.V.T.R. | | Heat Seal (g.) | Wet Anchorage |
|---|---|---|---|---|---|
| | | g./m.² day | g./m.² of coating | | |
| Latex A | Nonblocking | 11 | 6.0 | 174 | Fair. |
| Blend 36%A/ 64%B | do | | | 257 | Good. |
| Latex B | Laminated | 3.9 | 9.0 | 800 | Do. |

The properties of the blend of latexes were generally improved over each of the individual latex coatings.

W.V.T.R. as set forth in the above table refers to the water vapor transmission rate which was determined by placing the coated test film over the top of an aluminum cup containing calcium chloride. The test assembly is weighed and allowed to stand for one day (24 hours) at 100° F. and 95 percent relative humidity. The assembly is removed at the end of the test period and reweighed. The weight loss is given as grams per square meter per day.

The heat-seal test results set forth in the above table are determined by superimposing two pieces of coated film so that coated faces contact each other and the grain of the films are parallel. The surfaces are sealing by applying a pressure of 20 lbs./sq. inch at a temperature of 265° F. for 2 seconds. Samples 2 inches wide are cut from the sealed films and the force necessary to separate the 2 inch strips is measured on a standard test machine. This force in grams is known as the heat seal.

The blocking tendency of the coated film as reported in the above table was determined by removing the top sheet in a stack of test film which had been conditioned at a standard temperature, pressure, humidity and time. The film was rated as to its tendency to mat or stick to the adjacent sheet in the stack.

Wet anchorage in Table I refers to the ability of the coating and the base film to adhere to each other under moist conditions. More particularly this property was tested by conditioning test samples overnight at 75° F. and 45 percent R.H. and then trimming three sides of the coated film and immersing it in distilled water for about 17 hours. The film was rated as to the adherence of the coating to the base. A rating of fair in the water anchorage test means that the coating can be removed by pressured rubbing after about 17 hours in water and a rating of good indicates that coating can be removed only by rumpling the film after 17 hours in water.

EXAMPLE II

A latex blend comprising latex C and latex D was prepared. Latex C contained a copolymer consisting of 90 parts of vinylidene chloride and 10 parts of 2-ethylhexyl acrylate. Latex D contained a copolymer consisting of 90 parts vinylidene chloride and 10 parts of acrylonitrile. Both latexes C and D contained 35 percent solids and essentially the same concentrations of salts and dispersant. The properties of regenerated cellulose film having a thickness of 0.9 mil, anchored with a melamine-formaldehyde precondensate, and coated with these latexes and with latex blends are given in the following table.

*Table II*

| | Block | W.V.T.R. | | Heat Seal (g.) | Wet Anchorage |
|---|---|---|---|---|---|
| | | g./m.² day | g./m.² of coating | | |
| Latex C | Nonblocking | 35.5 | 5.4 | 258 | Good. |
| Blend: | | | | | |
| 70%C/30%D | do | 15.2 | 7.5 | 242 | Fair. |
| 20%C/80%D | Very slight block. | 13 | 5.4 | 488 | Good. |
| Latex D | Laminated | 15.3 | 9.6 | 880 | Do. |

The above table demonstrates the improvement in the properties of the coated regenerated cellulose film with a blended latex coating in accordance with the invention. It is surprising to note that the water vapor transmission rate of films coated with the blends was apparently improved to an extent above that of film coated with either latex C or latex D.

EXAMPLE III

In order to show the superiority of blended latex coatings of the invention over three-component interpolymer latexes, the following example is set forth.

An interpolymer latex designated latex E containing 35 percent solids and in which the polymer contained 83 percent vinylidene chloride, 13 percent "decyl-octyl" methacrylate and 4 percent methyl acrylate gave a coating with properties set forth in the following table on a regenerated cellulose film having a thickness of 0.9 mil and anchored as described in Example I. A terpolymer latex designated latex F containing 35 percent solids and in which the polymer contained 87.5 percent vinylidene chloride, 7.5 percent acrylonitrile and 5 percent "decyl-octyl" methacrylate was also used to coat regenerated cellulose film having a thickness of 0.9 mil and anchored as described in Example I. The properties of this coated film are also set forth in the following table. Another terpolymer latex designated latex G containing 35 percent solids and in which the polymer contained 90 percent vinylidene chloride, 6 percent ethyl acrylate, and 4 percent methacrylic acid produced coatings on regenerated cellulose film having a thickness of 0.9 mil and anchored as described in Example I, having blocking properties as set forth in the following table. All of the latexes contained essentially the same salt and dispersant concentrations.

*Table III*

| | Block | W.V.T.R. | | Heat Seal (g.) | Wet Anchorage |
|---|---|---|---|---|---|
| | | g./m.² day | g./m.² of coating | | |
| Latex E | Bad block | 27 | 7.8 | 453 | Poor. |
| Latex F | do | 25 | 9.3 | 900 | Good. |
| Latex G | Blocked | | | | |

EXAMPLE IV

Batches of latex D of Example II wherein the copolymer contained 90 parts of vinylidene chloride and 10 parts by weight of acrylonitrile were prepared with both 4 and 8 parts of a colloidal silica (38% solids), a known antiblocking agent, to 100 parts of the latex. These latexes were used to coat regenerated cellulose film having a thickness of 0.9 mil and anchored as previously described. The coated film showed properties set forth in the following table:

Table IV

|  | Block | Slip |
| --- | --- | --- |
| Latex D and 4 parts colloidal silica | Laminated | No. |
| Latex D and 8 parts colloidal silica | do | Some. |

Similar unsatisfactory results were obtained with vinylidene chloride-acrylonitrile polymer latex coated film wherein the latex had either a wax or a clay incorporated to improve slip and block properties. The vinylidene chloride-acrylonitrile copolymer coatings can take clay or wax in amounts only up to about 2 percent of the latex before the clarity of the film is degraded. These amounts of anti-blocking agents, as stated above, do not produce satisfactory results.

The above data demonstrate the difficulty of obtaining good anti-blocking and slip properties on films coated with this type of latex. Even with the addition of known anti-blocking material, improvement is negligible. As seen in Table II, 20 percent of latex C blended with latex D improves blocking significantly and in addition the moisture transmission rate is lowered. The blended latex coatings gave excellent moisture resistance, heat seal and anchorage, while improvement of the blocking or matting tendency without degradation of other properties is unexpectedly produced in accordance with this invention. The beneficial results are even more surprising and unexpected in view of the difficulties of blending latexes of this type to establish compatible blends.

Generally, aqueous dispersions of the copolymer material are prepared containing from about 10 to 50 percent solids. However, for continuous coating of film under actual plant production conditions, dispersions containing from about 15 to 25 percent solids are preferred.

Various modifications and adjustments may be made in practicing the invention without departing from its spirit and scope and it is to be understood, therefore, that the invention is not to be limited except as defined by the appended claims.

We claim:
1. A method of coating regenerated cellulosic film which comprises blending from 10 to 90 percent of an aqueous dispersion of a copolymer containing from about 85 to 94 percent by weight of vinylidene chloride and from about 6 to 15 percent by weight of a monomer selected from the group consisting of ($C_8$–$C_{18}$) alkyl acrylates and methacrylates, and from 10 to 90 percent of an aqueous dispersion of a copolymer containing from about 80 to 94 percent by weight of vinylidene chloride and from about 6 to 20 percent by weight of a monomer selected from the group consisting of acrylonitrile, ($C_1$–$C_6$) alkyl acrylates and methacrylates, acrylic acid, and methacrylic acid; and coating the surface of said regenerated cellulosic film with the blended aqueous dispersion.

2. A method for coating regenerated cellulosic film which comprises blending from 30 to 70 percent by weight of an aqueous dispersion of a copolymer containing from about 90 percent vinylidene chloride and about 10 percent of a monomer selected from the group consisting of ($C_8$–$C_{18}$) alkyl acrylates and methacrylates, and from about 30 to 70 percent by weight of an aqueous dispersion of a copolymer containing about 90 percent by weight of vinylidene chloride and about 10 percent by weight of a monomer selected from the group consisting of acrylonitrile, ($C_1$–$C_6$) alkyl acrylates and methacrylates, acrylic acid and methacrylic acid, and coating said regenerated cellulosic film with the blended aqueous dispersion.

3. A method for coating regenerated cellulosic film which comprises blending from 30 to 70 percent by weight of an aqueous dispersion of a copolymer containing from about 90 percent vinylidene chloride and about 10 percent of ($C_8$–$C_{18}$) alkyl acrylate, and from about 30 to 70 percent by weight of an aqueous dispersion of a copolymer containing about 90 percent by weight of vinylidene chloride and about 10 percent by weight of a monomer selected from the group consisting of acrylonitrile, ($C_1$–$C_6$) alkyl acrylates and methacrylates, acrylic acid and methacrylic acid; and coating regenerated cellulosic film with the blended aqueous dispersion.

4. The method of claim 3 wherein the monomer is acrylonitrile.

5. The method of claim 3 wherein the monomer is a ($C_1$–$C_6$) alkyl methacrylate.

6. A method of coating regenerated cellulosic film which comprises blending from 30 to 70 percent by weight of an aqueous dispersion of a copolymer containing from about 90 percent vinylidene chloride and about 10 percent of a ($C_8$–$C_{18}$) alkyl methacrylate, and from about 30 to 70 percent by weight of an aqueuos dispersion of a copolymer containing from about 90 percent by weight of vinylidene chloride and about 10 percent by weight of a monomer selected from the group consisting of acrylonitrile, ($C_1$–$C_6$) alkyl acrylates and methacrylates, acrylic acid and methacrylic acid; and coating said regenerated cellulosic film with the blended aqueous dispersion.

7. The method of claim 6 wherein the monomer is acrylonitrile.

8. The method of claim 6 wherein the monomer is a ($C_1$–$C_6$) alkyl methacrylate.

9. A method of coating regenerated cellulose film which comprises blending from about 30 to 70 percent by weight of an aqueous dispersion of a copolymer containing from about 90 percent vinylidene chloride and about 10 percent of a monomer selected from the group consisting of ($C_8$–$C_{18}$) alkyl acrylates and methacrylates, said aqueous dispersion having about 15 to 25 percent solids, and from about 30 to 70 percent by weight of an aqueous dispersion of a copolymer containing about 90 percent by weight of vinylidene chloride and about 10 percent by weight of a monomer selected from the group consisting of acrylonitrile, ($C_1$–$C_6$) alkyl acrylates and methacrylates, acrylic acid and methacrylic acid; said aqueous dispersion having about 15 to 25 percent solids, and coating said regenerated cellulose film with the blended aqueous dispersion.

10. The method of claim 9 wherein the second mentioned copolymer contains acrylonitrile.

11. The method of claim 9 wherein the second mentioned copolymer contains a $C_1$–$C_6$ alkyl methacrylate.

References Cited in the file of this patent
UNITED STATES PATENTS

| 2,748,027 | Meier | May 29, 1956 |
| 2,909,449 | Banigan | Oct. 20, 1959 |